United States Patent

[11] 3,627,840

[72] Inventor Ludwig A. Beer
  Agawam, Mass.
[21] Appl. No. 788,051
[22] Filed Dec. 30, 1968
[45] Patented Dec. 14, 1971
[73] Assignee Monsanto Company
  St. Louis, Mo.

[54] PROCESS FOR MAKING IMPACT RESISTANT BLENDS AND POLYMER BLENDS PRODUCED THEREBY
15 Claims, No Drawings

[52] U.S. Cl. .................................................. 260/876 R,
  260/29.6 RB, 260/878 R, 260/897 C
[51] Int. Cl. ........................................................ C08f 19/18,
  C08f 41/12, C08f 19/10
[50] Field of Search ............................................ 260/876,
  878

[56] References Cited
UNITED STATES PATENTS
3,112,290 11/1963 Salyer ........................... 260/878 X
3,162,696 12/1964 Zimmerman et al. ........ 260/878
3,287,443 11/1966 Saito et al. .................... 260/876
3,288,886 11/1966 Himei et al. .................. 260/876
3,488,743 1/1970 Baer et al. ..................... 260/878 X
3,522,200 7/1970 Hardt et al. ................... 260/878 X FOREIGN PATENTS
684,751 4/1964 Canada ......................... 260/876
722,223 11/1965 Canada ......................... 260/876

Primary Examiner—Murray Tillman
Assistant Examiner—Helen W. Roberts
Attorneys—H. B. Roberts, A. E. Hoffman and P. J. Hogan ABSTRACT: A novel graft copolymer blend is prepared having an ethylene interpolymer rubbery substrate and a graft superstrate of an interpolymer of a monovinylidene aromatic hydrocarbon, an alkyl (alk)acrylate, and/or an ethylenically unsaturated nitrile. The ethylene interpolymer contains vinyl chloride and/or vinylidene chloride. The superstrate may be of uniform polymeric composition or it may be formed by two or more different polymers having differing polarity. Blends of such graft copolymer blends with vinyl chloride polymers having a high degree of transparency are also disclosed.

PROCESS FOR MAKING IMPACT RESISTANT BLENDS AND POLYMER BLENDS PRODUCED THEREBY

BACKGROUND OF THE INVENTION

As is well known, blends of various polymers with rubbery polymers often afford significant advantages in providing compositions having enhanced toughness to render them suitable for many applications. Such impact modification is widely employed in connection with styrene, styrene/acrylonitrile and vinyl chloride polymers. Although some benefit may be obtained by mechanical blending with the unmodified rubber, it has generally been necessary to select a rubbery polymer of a composition compatible with the matrix polymer, or to use a compatibilizing agent, or to graft onto the rubbery substrate a polymer which would improve the chemical adhesion of the rubbery polymer to the matrix polymer. In many instances, the grafted polymer has had the same composition as the matrix polymer.

In the manufacture of impact modified vinyl chloride polymers, graft copolymers of chemical composition distinct from the vinyl chloride have been widely employed as have grafts of vinyl chloride onto olefin polymers such as chlorinated polyethylene and ethylene/vinyl acetate. An impact modifier formed by polymerizing a mixture of styrene and acrylonitrile-type monomers onto a diene rubber is disclosed in Hayes U.S. Pat. No. 2,802,809 granted on Aug. 13, 1957. An impact modifier formed by polymerizing a mixture of styrene and alkyl methacrylate-type monomers onto a diene rubber substrate is disclosed in Feuer U.S. Pat. No. 2,857,360 granted Oct. 21, 1958. More recently, polymerization of a mixture of styrene, acrylonitrile and methyl methacrylate monomers onto a diene rubber substrate has been proposed in Saito et al. U.S. Pat. No. 3,287,443 granted Nov. 22, 1966. In Himei et al. U.S. Pat. No. 3,288,886 granted Nov. 27, 1966, there is proposed still another type of graft copolymer provided by first polymerizing styrene in the presence of the rubber followed by polymerization of methyl methacrylate.

In order to achieve optimum properties, it is important that the graft superstrate exhibit excellent bonding or adhesion to the matrix. In addition, there has been a growing desire to provide impact modified polymer blends which would exhibit substantial transparency resulting in many efforts to match the refractive index of the rubbery polymer with that of the matrix polymer and recently to graft the rubbery polymer with a superstrate polymer having a refractive index to the opposite side of that of the matrix polymer from that of the rubbery polymer so that the composite of the refractive indices of the rubbery polymer and graft superstrate would equal that of the matrix polymer.

Commercially, the impact modifiers most widely employed for blending with vinyl chloride polymers are chlorinated polyethylene, grafts of styrene/methyl methacrylate onto a butadiene polymer, grafts of styrene/acrylonitrile onto a butadiene polymer, and grafts of vinyl chloride onto polyethylene, chlorinated polyethylene or an ethylene/vinyl acetate copolymer. Although blends containing such impact modifiers have improved impact properties, some achieve this result only at relatively high cost or with sacrifice of transparency or other properties.

It is an object of the present invention to provide a method for making a novel graft copolymer blend having an ethylene interpolymer rubbery substrate and a superstrate including monovinylidene aromatic hydrocarbon monomer and alkyl (alk)acrylate and/or ethylenically unsaturated nitrile monomers.

It is also an object to provide such a method which is facile and highly effective and which can be utilized to produce a graft copolymer blend affording a desirable balance of properties when blended with vinyl halide polymers to provide a transparent blend.

Still another object is to provide novel vinyl halide polymer blends exhibiting good impact resistance and transparency and which are advantageously employed for packaging and other applications where toughness and transparency are desired.

SUMMARY OF THE INVENTION

It has now been found that the foregoing and related objects can be readily attained by a process in which there is formed an admixture of a rubbery ethylene interpolymer substrate and a polymerizable monomer formulation containing a monovinylidene aromatic hydrocarbon monomer and a monomer selected from the group consisting of alkyl (alk)acrylates, ethylenically unsaturated nitriles and mixtures thereof. The ethylene interpolymer is an interpolymer of ethylene with a monomer selected from the group consisting of vinyl chloride, vinylidene chloride, and mixtures thereof. The admixture is subjected to polymerization conditions to effect polymerization of the monomers and grafting of at least a substantial portion of the polymer formed onto the rubbery ethylene interpolymer substrate, thereby forming a graft polymer blend.

Although the monomer formulation may be uniform in composition throughout polymerization, it may also be varied so as to produce a series of polymers of different chemical composition which provide a composite superstrate evidencing a polarity gradient. More particularly, using a monomer formulation initially of relatively low polarity such as styrene alone or a mixture rich in styrene and then increasing the polarity of the polymer by the use of the more polar monomers will result in a composite graft copolymer which has a polarity gradient with a shell relatively rich in the more polar polymer. In addition, grafting can be favored by adding the monomers over a period of time during the polymerization cycle.

Although the graft copolymer blend thus formed may be utilized per se for various applications as a rubber modified material such as those where ABS materials are employed, it has especial utility as an impact modifier for other polymers. By proper selection of the chemical composition of the rubbery ethylene interpolymer substrate and the ratio of the monomers in the superstrate and the amounts thereof grafted onto the rubbery substrate, the apparent refractive index of the graft copolymer blend can be closely matched to the refractive index of the matrix polymer to provide a transparent composition having highly desirable impact strength, good chemical resistance and a balance of other properties. Such impact modification has been especially useful in the manufacture of vinyl halide polymer blends for packaging and other applications.

DESCRIPTION OF THE PREFERRED EMBODIMENTS

As previously indicated, the novel graft copolymer blend of the present invention is comprised of a rubbery ethylene polymer substrate and a superstrate formed of a monovinylidene aromatic hydrocarbon monomer and an alkyl (alk)acrylate monomer and/or ethylenically unsaturated nitrile monomers. Although the polymerization blend may be used per se particularly when there is a substantial amount of ungrafted interpolymer formed, it will generally be employed in a blend with another polymer such as vinyl chloride. The characteristics and utility of the graft copolymer blend will vary depending upon various factors of composition and the technique of preparation as will be pointed out in detail hereinafter.

Nature of the Rubbery Ethylene Interpolymer Substrate

The rubbery ethylene polymers onto which the monomers may be grafted during the polymerization in the presence thereof to provide the substrate of the graft copolymer are interpolymers of ethylene with a monomer selected from the group consisting of vinyl chloride, vinylidene chloride and mixtures thereof. Generally, ethylene will comprise 25–75 percent by weight of the interpolymer and the comonomer accordingly will comprise 75–25 percent by weight thereof. Of the various interpolymers, those of ethylene with 40–75 percent by weight of vinyl chloride are preferred.

The interpolymer should be substantially free from crystallinity at ambient temperature and preferably has a second order glass transition temperature not higher than 0° C. (as determined by ASTM Test D 746–52T) and preferably less than −20° C. The interpolymer should exhibit good recovery and impact absorption as is well appreciated in the art with respect to various ethylene interpolymers used for applications where rubberlike properties are desired. Minor amounts (less than 20 percent by weight) of other ethylenically unsaturated monomers may be included in the interpolymer if so desired but are not necessary and may tend to reduce the efficacy thereof as a rubbery material or reduce the suitability thereof for the blends of the present invention. Such other monomers include acrylic acid and its esters, alkacrylic acids and their esters, ethylenically unsaturated nitriles, etc.

Various techniques are customarily employed for polymerizing the monomers of the rubbery polymer including mass, suspension and emulsion polymerization. Emulsion polymerization can be used to produce a latex emulsion which is useful as the base for emulsion polymerization of the graft copolymer blend.

When transparency is not desired, the average particle size of the rubber substrate prior to grafting may vary from as little as 0.01 micron to as large as about 10.0 microns, and preferably about 0.08 to 2.0 microns for optimum benefit to impact properties. If a transparent composition is desired, the average particle size should not be larger than about 0.4 micron and preferably about 0.08 to 0.3 micron. However, it will be appreciated that minor amounts of the rubber substrate may be of larger particle size when a transparent composition is desired albeit with a tendency towards haze.

The Monomers of the Superstrate

Exemplary of the monovinylidene aromatic hydrocarbons which may be used in the superstrate polymers are styrene; alpha-alkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene, vinyl anthracene, etc. The alkyl substitutents generally have one to four carbon atoms and may include isopropyl and isobutyl groups. If so desired, mixtures of such monovinylidene aromatic monomers may be employed. Styrene and alkylstyrenes are preferred for most applications, and styrene has been most beneficially employed in obtaining impact modifiers for transparent vinyl chloride blends.

Generally, the alkyl groups of the alkyl (alk)acrylates will have from one to 15 carbon atoms and preferably one to eight carbon atoms in their chain. The alkacrylic acid from which the ester is derived will normally have an alkyl chain of one to six carbon atoms and preferably one to four carbon atoms. Exemplary compounds are methyl methacrylate, ethyl methacrylate, propyl methacrylate, etc.; methyl ethacrylate, butyl acrylates, etc. Methyl methacrylate is preferred for purposes of the present invention because of cost and other factors.

Exemplary of the ethylenically unsaturated nitriles which may be used are acrylonitrile, methacrylonitrile, ethacrylonitrile, alpha-methylene glutaronitrile, and mixtures thereof. Acrylonitrile and methacrylonitrile are preferred and acrylonitrile is particularly advantageously employed in making modifiers for transparent blends with polyvinyl chloride.

Minor amounts of other copolymerizable monomers may also be included in the superstrate polymer when so desired. Exemplary of said monomers are acrylic acid, alkacrylic acids, acrylate esters, fumarates, maleates, acrylamide, methacrylamide, etc. Such additional monomers should comprise not more than 15 percent by weight of the superstrate polymer, and their effect upon the refractive index of the graft copolymer blend must be considered when a transparent impact modifier is being sought as must be their effect upon the physical properties thereof.

Generally the total amount of monovinylidene aromatic hydrocarbon in the charge and in the polymer formed thereby will be 35 to 80 percent by weight of the interpolymer, and the alkyl (alk)acrylate and ethylenically unsaturated nitrile monomers will comprise 20 to 65 percent by weight thereof. Desirably 45 to 75 percent by weight of the charge and superstrate will be the monovinylidene aromatic hydrocarbon. For transparent polyblends with vinyl chloride using an ethylene/vinyl chloride substrate (25–55:75–45), the preferred interpolymers contain 75 to 55 percent by weight of styrene and 25 to 45 percent methyl methacrylate and/or acrylonitrile.

As will be readily apparent, the ratio of the grafted polymer to the rubbery substrate may vary widely and is generally within the range of 0.5 to 2.5 parts by weight of the grafted polymers per part by weight of rubbery substrate. The preferred composite graft copolymers have a superstrate:substrate ratio of about 0.8–1.6:1.0 so as to obtain a balance between preservation of the rubbery character of the substrate and the desired chemical adhesion and transparency.

The polymerizable monomers are admixed with the rubbery ethylene interpolymer substrate over a period of time and are subjected to polymerization conditions. Although mass polymerization and suspension polymerization, or the combination thereof, may be used to effect such graft polymerization, emulsion polymerization is preferred since it has been found particularly advantageous for the present invention and affords a highly desirable transparent impact modifier for other polymers. Whichever process is utilized, it should be appreciated that at least the principal portion of the monomers are most desirably added either incrementally or preferably continuously over a period of the polymerization cycle in order to promote grafting efficiency.

In the emulsion polymerization process, the rubbery substrate and the monomers as added are emulsified in water by use of suitable emulsifying agents such as fatty acid soaps, alkali metal or ammonium soaps of high-molecular weight alkyl or alkaryl sulfates and sulfonates, ethoxylated phosphate ester surface active agents, mineral acid salts of long chain aliphatic amines, etc. Emulsifying agents which have proven particularly advantageous are sodium oleate, sodium palmitate, sodium stearate and other sodium and potassium soaps. The amount of water in which the monomers and rubber substrate are emulsified may vary depending upon the emulsifying agent, the polymerization conditions and the particular monomers. However, it should be appreciated that the ratio of the emulsifier to water will tend to affect the size of the dispersed particles. Normally, the admixture when using soaps will be somewhat basic, i.e., about 7.8 to 10.0; however, other emulsifying agents such as the phosphate esters permit use of acid conditions.

If so desired, the aqueous latex formed in the emulsion polymerization of the rubbery substrate may provide the aqueous medium into which the monomers are incorporated with or without additional emulsifying agents, etc. However, the rubbery polymer may be dissolved in monovinylidene aromatic monomer and the mixture emulsified, or a latex thereof may be separately prepared. Generally, any emulsifying agent added during polymerization of the ethylene monomer formulation to produce a rubbery latex useful for the present invention is in an amount less than about 4.0 percent by weight based upon the weight of the monomers. Sometimes, the emulsifying agent which has been added for the polymerization of the rubbery substrate may be sufficient for emulsification of the monomers for the graft polymerization reaction. However, in the interests of obtaining latex stability and greater control over the emulsion and particle size, small amounts of emulsifying agent may be added during the graft polymerization reaction. However, such addition should be closely controlled so as not to deleteriously affect the particle size of the dispersed phase.

Actinic radiation and both water-soluble and monomer-soluble peroxy-type catalysts with or without a reducing agent to form a redox system may be employed for the graft polymerization reaction with variable efficacy depending upon the particular polymerization technique employed. In some emulsion polymerization processes, it is advantageous to use a redox system since it permits the use of slower catalysts with equivalent conversion periods.

Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide, benzoyl peroxide, lauroyl peroxide, oleyl peroxide, toluyl peroxide, tert-butyl diperphthalate, tert-butyl peracetate, tert-butyl perbenzoate, dicumyl peroxide, di-isopropyl-peroxydicarbonate, 2.5-dimethyl-2, 5 di-(tert-butylperoxy)hexane, 2,5-dimethyl-2,5-di(tert-butylperoxy)hexyne-3, tert-butyl hydroperoxide, cumene hydroperoxide, p-menthane hydroperoxide, cyclopentane hydroperoxide, diisopropyl-benzene hydroperoxide, p-tert-butylcumene hydroperoxide, pinane hydroperoxide, 2,5-dimethylhexane-2,5-dihydroperoxide, etc.; azo-bis-isobutyronitrile; and mixtures thereof.

The catalyst is generally included within the range of 0.001 to 2.0 percent by weight, and preferably on the order of 0.005 to 1.0 percent by weight of the polymerizable material, depending upon the monomers, the polymerization technique, and the desired polymerization cycle. An excess of catalyst during the initial period of polymerization will tend to favor the grafting reaction.

Exemplary of the reducing agents which may be employed are alkali metal and ammonium sulfites, hydrosulfites, metabisulfites, thiosulfates, sulfinates, formaldehydesulfoxylates or ascorbic acid, dioxyacetone, dextrose, etc. Various other reducing agents for redox systems may also be employed.

The amount of reducing agent will be about 0.001 to 1.0 percent by weight, and preferably on the order of 0.005 to 0.5 percent by weight, of the polymerizable monomer formulation, depending on the catalyst and the amount thereof. For redox systems, minute amounts of activators or promoters such as ferrous salts, cobalt and copper salts may be included.

Molecular weight regulators may be included in the formulation for the graft polymerization reaction so as to control the molecular weight and achieve the desired properties. Exemplary of such molecular weight regulators are the higher alkyl mercaptans and terpenes, specifically n-dodecyl mercaptan, terpinolene, d-limonene, etc.

Although a significant proportion (and even all) of the polymerizable monomers may be initially admixed with the rubbery substrate initially, the process most beneficially utilizes controlled monomer addition over a period of time. Although up to 50 percent of the monomers may be present in the admixture initially when it is subjected to polymerization conditions, particularly when the amount of catalyst or promoter and polymerization conditions are selected so as to produce relatively slow polymerization initially, it is most advantageous to process control and to achieving the optimum benefits of the present invention that the polymerizing admixture be monomer starved, i.e., that there be no substantial excess of polymerizable monomers at any given time so that the monomers are polymerized within a short time after their addition. Not only does this favor the grafting reaction and thus the efficiency of the process, but also it enables optimum control of the polymer being formed since the composition of the interpolymers being formed will approach the concentration of the monomers in the feed and thereby in the polymerizing admixture at that time. In contrast, a large excess of one of the monomers will, depending upon that monomer, favor an azeotropic composition or tend to produce some homopolymer because of its greater reactivity. Accordingly, the preferred process of the present invention utilizes addition of at least 50 percent, and preferably at least 80 percent, of the monomers in increments or continuously over a period of time during the polymerization cycle. In addition, the rate is selected in the preferred process with respect to the polymerization conditions so that the unpolymerized monomers in the admixture is less than 20 percent by weight of the rubbery substrate at any given time, and preferably less than 10 percent by weight thereof.

The rate of addition of the several monomers may be constant or the initial monomer feed may be rich in the relatively nonpolar monovinylidene aromatic monomer or it may be a less polar mixture of the monovinylidene aromatic hydrocarbon and alkyl (alk)acrylate followed by a more polar mixture of monovinylidene aromatic hydrocarbon and ethylenically unsaturated nitrile monomers. Desirably, the rate of addition of the monovinylidene aromatic hydrocarbon or the comonomer may be varied to achieve the desired variation in composition and resulting polarity gradient. For example, the monovinylidene aromatic hydrocarbon may be added at a relatively rapid rate during the initial period of monomer addition and then the rate may be reduced to extend the period over which the monovinylidene aromatic hydrocarbon is being added and thereby provide relatively small concentrations thereof relative to the alkyl (alk)acrylate and/or nitrile monomers over the terminal portion of the monomer addition period. This type of variation offers the advantage of producing optimum swelling of the polymer and internal grafting of the rubbery polymer particle during the initial portion of the cycle and still ensures a desirable polarity gradient. Conversely, the rate of addition of the alkyl (alk)acrylate and/or nitrile monomers may be increased towards the end of the addition period to increase the concentration of these polar monomers present in the polymerizing admixture and thus favor the production of interpolymers rich in alkyl (alk)acrylate and/or nitrile at the end of the cycle. Both of these variations may be employed simultaneously if so desired. Another similar expedient is provided by adding a significant portion of the monovinylidene aromatic hydrocarbon monomers and subjecting it to polymerization prior to addition of the comonomers(s). Still another technique is to polymerize a mixture of monovinylidene aromatic hydrocarbon and an alkyl (alk)acrylate and then to polymerize a mixture of monovinylidene aromatic hydrocarbon and an ethylenically unsaturated nitrile.

The particular polymerization conditions employed will vary with the monomer formulation and the catalyst. Generally, the reaction will increase with an increase in temperature although a limiting factor is possible deterioration in product properties and also a tendency to produce problems in maintaining latex instability. Generally, temperatures of about 30° to 100° C. and pressures of about 0–50 p.s.i.g. have been found suitable for a fairly efficient graft polymerization reaction in an emulsion process. If so desired, an inert atmosphere may be employed over the polymerizing admixture.

After the polymerization reaction has proceeded to the desired degree of conversion of the monomers, which will normally be more than 90 percent, any unreacted monomers should be stripped. After polymerization, the graft copolymer blend from the preferred emulsion process may be recovered by freeze or salt coagulation in the form of a crumb, or by spray drying; the graft polymer blend may be washed for subsequent processing. Alternatively, the latex may be combined with a latex of the matrix polymer and coagulated or spray dried therewith. The amount of ungrafted polymer produced by the graft polymerization reaction will vary with the efficiency of the graft reaction and the ratio of monomers to rubbery substrate in the charge. By variation in these factors, the amount of ungrafted polymer will normally vary within the range of about five to 150 parts per 100 parts of graft copolymer with the higher ratios being produced by high monomer/rubbery polymer charges. The amount of ungrafted polymer should be less than 50 parts per 100 parts of graft copolymer, and preferably less than 30 parts, when the graft copolymer is to be utilized as an impact modifier for another polymer. However, the interpolymer is not particularly detrimental to vinyl halide polymers so that greater amounts can be tolerated if so desired.

Polymeric Blends

As previously indicated, the graft polymer blends of the present invention may be blended with other polymers to impart impact resistance thereto. Since the superstrate of the present invention is relatively polar in nature and can be made more so as indicated previously, the matrix polymer should be one which is relatively polar in character so as to obtain the intended optimum adhesion between the two phases. In addition, the matrix polymer and the interpolymers of the superstrate must be sufficiently physically compatible to achieve a stable system.

Among the polymers which may be modified by the graft copolymers of the present invention are interpolymers of monovinylidene aromatic hydrocarbons and monomers such as the unsaturated nitriles and/or (alk)acrylates; and vinyl halide polymers such as vinyl chloride, vinyl chloride/vinyl acetate, vinyl chloride/vinylidene chloride, chlorinated polyvinyl chloride and graft copolymers of vinyl chloride onto suitable substrates such as chlorinated polyethylene, ethylene/vinyl ester copolymers, ethylene/propylene terpolymers, etc.

The graft copolymers are most advantageously utilized with vinyl halide polymers, and particularly those of vinyl chloride and less desirably those of vinyl fluoride. Vinyl chloride is the preferred vinyl halide monomer and may be used alone or in combination with vinyl fluoride and/or other ethylenically unsaturated compounds copolymerizable therewith. In the case of interpolymers of vinyl halides with other ethylenically unsaturated compounds, the amount of comonomer generally should not exceed about 25 percent by weight of the interpolymer, and preferably should not exceed 15 percent by weight thereof.

Ethylenically unsaturated monomers which may be interpolymerized with the vinyl halides include vinylidene halides such as vinylidene chloride; vinyl esters such as vinyl acetate; acrylic and alpha-alkyl acrylic acids such as acrylic and methacrylic acids; the alkyl esters of such acrylic and alkylacrylic acids such as methyl acrylate, ethyl acrylate, methyl methacrylate; amides of acrylic and alkyl-acrylic acids such as acrylamide, methacrylamide; unsaturated nitriles such as acrylonitrile, methacrylonitrile, ethacrylonitrile; monovinylidene aromatic hydrocarbons such as styrene and alpha-alkyl styrenes; dialkyl esters of maleic acid such as dimethyl maleate and the corresponding fumarates; vinyl alkyl ethers and ketones; ethylene; and other ethylenically unsaturated compounds copolymerizable with the vinyl halides. Mixtures of compounds exemplified by the foregoing materials may also be used to form the vinyl halide polymer.

The method used to prepare the vinyl halide resins may be any which is commonly practiced in the art; the polymerization may be effected en masse, in solution or with the monomer in an aqueous dispersion. From the standpoint of economics and process control, highly suitable polymers can be prepared by a method in which the monomer reactants are suspended in water. Other variations upon the polymerization method may also be utilized in order to vary the properties of the product, one example of which is polymerization at relatively high temperatures which normally produces polymers having low shear characteristics. Highly fluid resins can also be prepared by utilizing a technique in which the monomer charge or a portion thereof is continuously fed to the reaction vessel, which is believed to promote branching.

However, the graft copolymers may also be used advantageously with interpolymers formed of monovinylidene aromatic hydrocarbon monomers and polar monomers with which the interpolymer of the monovinylidene aromatic hydrocarbon and alkyl alkacrylate is compatible. The monovinylidene aromatic hydrocarbons have already been described in connection with the interpolymers of the graft copolymer. The polar monomers include the unsaturated nitriles and alkyl alkacrylates which have also been described in connection therewith. Other polar monomers which may be interpolymerized with the monovinylidene aromatic hydrocarbon monomers are alpha-, beta-unsaturated monobasic acids and derivatives thereof; e.g., acrylic acid, methyl acrylate, ethyl acrylate, butyl acrylate, 2-ethylhexyl acrylate, methacrylic acid, ethacrylic acid (corresponding esters of the alkacrylic acids constitute the alkyl alkacrylates); acrylamide, methacrylamide; dialkyl maleates or fumarates such as dimethyl maleate, diethyl maleate, dibutyl maleate, the corresponding fumarates, etc. Mixtures of the polar monomers may also be employed, and the amount of these comonomers which may be included in the interpolymer will vary as the result of various factors.

The monovinylidene aromatic hydrocarbon interpolymers contain at least 10 percent by weight of the monovinylidene aromatic monomer and preferably at least 35 percent by weight thereof. They also contain at least 20 percent by weight of the polar monomer and preferably at least 30 percent by weight thereof. In addition, they may contain up to 15 percent by weight of other ethylenically unsaturated copolymerizable monomers. Of the various interpolymers, those preferred contain 30 to 80 percent, and most desirably 45 to 70 percent, by weight of the monovinylidene aromatic hydrocarbon and 70 to 20 percent, and preferably 55 to 30 percent, by weight of a nitrile of alkacrylate. By proper selection of the ratio of the monomers in the polymeric superstrate of the graft copolymer relative to the matrix polymer, a substantially transparent composition can be obtained which exhibits a high degree of impact resistance.

When a transparent composition is sought, the matrix polymer should in and of itself be transparent but it need not be water clear. Although the matrix polymer may be prepared by any suitable polymerization technique including mass, suspension and emulsion processes, the preferred processes for producing the matrix polymer utilize mass or suspension polymerization technology in order to obtain optimum clarity. Emulsion polymerization tends to introduce coloring impurities in the polymer by reason of the salts used for coagulation, the emulsifying agents, etc. The refractive index of the matrix interpolymer may be determined by the usual test methods or by reference to published literature. If so desired, graphic representations of the various matrix polymers may be utilized in determining the matrix interpolymer for use with a given graft copolymer, or vice versa.

Other Components

Various other optional materials may be added to the compositions of the present invention depending upon the intended use and nature thereof such as, for example, plasticizers, stabilizers, antioxidants, lubricants, processing aids and fillers. The amount and nature thereof will determine the possible effect upon the transparency of the blends. Generally, it is necessary to incorporate stabilizers and antioxidants to prevent degradation of the graft copolymer and oftentimes the matrix polymers. Although the stabilizers and antioxidants may be incorporated at the time of blending of the components into the final polyblend, generally it is most advantageous to incorporate these materials into the individual components after they are formed so as to minimize the tendency for degradation or oxidation during processing and storage.

Formation of the Polymer Blends

The final polymer blends may be prepared by admixing the components thereof in any of the customary ways including mill rolling, extrusion blending, etc. Where the matrix polymer is prepared by an emulsion polymerization process, the latex thereof may be admixed with the latex of the graft polymers blend and the mixed latex spray dried or coagulated, washed and dried.

Generally, the polymer blends may contain 2 to 20 percent by weight of rubbery polymer provided by the rubbery substrate of the graft polymer blend and the preferred compositions will normally contain about 5 to 15 percent. The polymer blends produced in accordance with the present invention may be substantially transparent, i.e., the transmittance through a molded specimen of 0.05 inch in thickness at 500 millimicrons wave length is at least 70 percent and generally considerably greater. To achieve this result, the refractive indices of the graft copolymer and matrix polymer must be closely matched, and the average particle size of the graft copolymer should be less than about 0.4 microns. The transparent compositions may vary from water clear to slightly yellow depending upon rubber components and impurities. Yellowish coloration can be neutralized by incorporation of the appropriate blue dyes. However, the blends do afford significantly advantageous transparency enabling their application to packaging, laminating and other uses where transparency is advantageous and where the remaining balance of properties of the family of blends obviously offers significant advantages.

Exemplary of the efficacy of the present invention are the following specific examples wherein all parts are parts by weight unless otherwise indicated.

Example One

To a closed reactor are added 400 parts of a latex of an ethylene/vinyl chloride rubbery copolymer (57/43) containing 25 percent solids and an average particle size of 0.143 micron. The rubbery polymer latex is heated under nitrogen with agitation to about 60° C. in a jacketed reactor, after which is added an aqueous solution containing 0.5 part of sodium formaldehyde sulfoxylate, 0.002 part ferrous sulfate $FeSO_4\text{-}byH_2O$ and 0.003 part ethylene diamine tetraacetic acid. To this emulsion is continuously added a mixture of 70 parts styrene, 30 parts acrylonitrile and 0.4 part di-isopropyl benzene hydroperoxide as an initiator.

Addition of the monomers is at a steady rate over a period of 2 hours and stirring at 60° C. is continued during the addition of the monomers and is continued for an additional period of 1 hour thereafter. The latex is subjected to freeze coagulation to recover the graft polymer blend, which is then filtered, washed and dried.

After addition of one part per 100 parts blend of a tin stabilizer, the crumb is fused and sheeted on a two-roll mill at 160° C. roll temperature for 5 minutes. Thereafter, test specimens are compression molded at 175° C. and 5000 p.s.i. for 10 minutes. The tensile properties of the test specimens are determined in accordance with ASTM Test D638–60 and the optical properties in accordance with ASTM Tests D1003–52, D1495–57 and D542–50. The results of the tests are set forth in the table below.

| | |
|---|---|
| Tensile Stress, p.s.i. | |
| At yield (10% strain/minute) | no yield |
| At failure (200% strain/minute) | 2990 |
| Percent Elongation | |
| At yield | |
| At failure | 152 |
| Tensile Modulus, p.s.i.×10⁵ | 0.965 |
| Refractive Index, $n_D^{25}$ | 1.5405 |

Example Two

For comparison, a graft copolymer blend is prepared utilizing a rubbery substrate with greater vinyl chloride content (70 parts vinyl chloride: 30 parts ethylene) and a monomer mixture of 60 parts styrene and 40 parts methyl methacrylate. The ethylene/vinyl chloride latex has an average particle diameter of 0.182 micron, an intrinsic viscosity of 0.84 (at 25° C. in tetrahydrofurane) and a Clash-Berg modulus of 135,000 p.s.i. at −27° C. It is diluted to 20 percent solids, heated to 60° C. under nitrogen and admixed with 0.5 part sodium hydrosulfite per 100 parts latex solids. A mixture of 60 parts styrene, 40 parts methyl methacrylate, and 0.5 part cumene hydroperoxide is added continuously to 500 parts of the latex over a period of 1½ hours. The admixture is stirred and maintained at 60° C. for 1 hour after the monomers have been added. The latex is coagulated by a solution of magnesium sulfate (2.5 percent by weight) at 85° C., and the crumb is filtered, repeatedly washed and dried. The graft copolymer crumb is sheeted and molded into test specimens as indicated in example one, and the tensile properties and refractive index are determined as follows:

| | |
|---|---|
| Tensile Stress, p.s.i. | |
| At yield (10% strain/minute) | 2300 |
| At failure (200% strain/minute) | 2430 |
| Percent Elongation | |
| At yield | 2.9 |
| At failure | 116 |
| Tensile Modulus, p.s.i.×10⁵ | 1.12 |
| Refractive Index, $n_D^{25}$ | 1.5390 |

Example Three

The test procedure of example two is substantially repeated except that 30 parts styrene containing 1 part divinyl benzene and 0.12 part cumene hydroperoxide is initially added to 500 parts of the latex and polymerized at 60° C. After this monomer component has been polymerized, a mixture of 35 parts styrene, 35 parts methyl methacrylate and 0.28 part cumene hydroperoxide is added and polymerized at 60° C. In this manner, styrene polymer is initially formed and grafted followed by the formation and grafting of a relatively polar 50:50 mixture of styrene/methyl methacrylate to provide a polarity gradient.

The crumb recovered is sheeted and compression molded into test specimens. The results of the tensile tests and the refractive index are set forth in the table below:

| | |
|---|---|
| Tensile Stress, p.s.i. | |
| At yield (10% strain/minute) | 2110 |
| At failure (200% strain/minute) | 2680 |
| Percent elongation | |
| At yield | 3.1 |
| At failure | 188 |
| Tensile Modulus, p.s.i.×10⁵ | 1.02 |
| Refractive Index $n_D^{25}$ | 1.5410 |

Example Four

The rubbery substrate employed contains 55 parts of vinyl chloride and 45 parts ethylene, and has a particle diameter of 0.21 micron and a specific viscosity of 0.170 (0.1 percent solution in tetrahydrofurane at 25° C.). The latex has a microgel content of 42 percent and is diluted to 25 percent solids content, after which it is heated to 60° C. under nitrogen. To 400 parts latex are added 0.2 part sodium bisulfite and 0.2 part sodium bicarbonate.

A mixture of 60 parts styrene, 20 parts acrylonitrile and 20 parts methyl methacrylate is prepared as is an aqueous solution containing 0.4 part potassium persulfate. Thirty parts of the monomer mixture is initially admixed with the latex and small amounts of the persulfate solution are added until polymerization is initiated as evidenced by a temperature rise in the reactor. Starting one-half hour after polymerization has started, the remaining monomer mixture is added continuously over a 1½ hour period while maintaining a 2°–3° C. temperature differential between batch and jacket by the addition of persulfate solution. The resultant graft copolymer blend is recovered by salt coagulation, washed and dried. It is sheeted and molded into test specimens, and the results of tensile tests and refractive index are set forth in the table below:

| | |
|---|---|
| Tensile Stress, p.s.i. | |
| At yield (10% strain/minute) | 1920 |
| At failure (200% strain/minute) | 2150 |
| Percent Elongation | |

| | |
|---|---|
| At yield | 3.4 |
| At failure | 218 |
| Tensile modulus, p.s.i.×10³ | 0.934 |
| Refractive index $n_D^{25}$ | 1.5370 |

Example Five

The rubbery polymer is a copolymer containing 61.5 parts vinyl chloride and 38.5 parts ethylene. It has a particle size of 0.165 micron and is diluted to 20 percent solids. To 500 parts of the latex are added 0.4 part sodium formaldehyde sulfoxylate and 0.0002 part ferrous sulfate.

After heating to 60° C. under nitrogen, there is added thereto continuously over 1 hour a mixture of 55 parts styrene, 45 parts methyl methacrylate and 0.4 part diisopropyl benzene hydroperoxide. One-half hour after the end of the addition of this monomer mixture, there is added continuously a mixture of 35 parts styrene, 15 parts acrylonitrile and 0.25 part tert-dodecylmercaptan. Simultaneously there are added small increments of a potassium persulfate solution. After total time period of 3 hours, the latex is coagulated with a hot calcium chloride solution, washed and dried. Specimens are again molded therefrom and tested, and the results are set forth below.

| | |
|---|---|
| Tensile Stress, p.s.i. | |
| At yield (10% strain/minute) | 2030 |
| At failure (200% strain/minute) | 3050 |
| Percent Elongation | |
| At yield | 3.8 |
| At failure | 133 |
| Tensile Modulus, p.s.i.×10³ | 0.87 |
| Refractive Index $n_D^{25}$ | 1.5405 |

Example Six

Vinyl chloride blends are made containing 15 percent by weight of the graft copolymer blends produced in accordance with examples one-five. The vinyl chloride polymer utilized for these blends is a suspension homopolymer (DP=1100) containing two parts dibutyl tin mercaptide heat stabilizer per 100 parts of resin and 0.6 part of an ester wax lubricant per 100 parts of resin. The vinyl chloride polymer and graft copolymer are milled on a two-roll mill for 5 minutes with the front and back rolls at 170° and 175° C., respectively, and test specimens are prepared by compression molding at 180° C. under 5000 p.s.i. pressure for 10 minutes.

Optical properties are determined in accordance with ASTM Test D1003–52 and impact properties are determined in accordance with ASTM Test D256–56. The results with respect to the several blends are set forth in the table below.

| Graft Copolymer Blend | % Haze 25 Mils at 550 mu. | Izod Impact Ft. lbs./in. Notch |
|---|---|---|
| Example One | 1.9 | 12.1 |
| Example Two | 4.5 | 5.6 |
| Example Three | 2.1 | 7.3 |
| Example Four | 3.9 | 8.6 |
| Example Five | 1.2 | 10.4 |

As can be seen from the results reported in foregoing table, the blends prepared by use of the several graft copolymer blends of the present invention offer highly desirable properties as evidenced by their relatively low haze and their relatively high impact strength. In contrast, blends made of the vinyl chloride resin and the ungrafted ethylene/vinyl chloride copolymers are either hazy or opaque.

Thus, it can be seen from the foregoing detailed specification and examples that the present invention provides novel graft copolymer blends utilizing an ethylene copolymer rubbery substrate and a superstrate of monovinylidene aromatic hydrocarbon and alkyl (alk)acrylate and/or unsaturated nitrile monomers. Although the graft copolymers or polymerization blends may be used per se for applications where impact properties are desirable, they are highly advantageously utilized in conjunction with other polymers as an impact modifier. By proper selection of the components, the polymeric blends produced therewith may exhibit substantial transparency in addition to high impact strength and may be advantageously employed for packaging and other applications.

What is claimed is:

1. A process which comprises (A) emulsion polymerizing 50–250 parts by weight of a polymerizable formulation comprising about 35–80 percent by weight of at least one monovinylidene aromatic monomer of the group consisting of monovinylidene aromatic hydrocarbons and ring-halogenated monovinylidene aromatic hydrocarbons and about 65–20 percent by weight of at least one comonomer of the group consisting of acrylonitrile, methacrylonitrile, ethacrylonitrile, alpha-methylene glutaronitrile, and an alkyl (alk)acrylate corresponding to the formula:

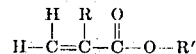

wherein R is H or an alkyl group of one to six carbon atoms and R' is an alkyl group of one to 15 carbon atoms in the presence of 100 parts by weight of a rubbery interpolymer comprising about 25–75 percent by weight of combined ethylene and about 75–25 percent by weight of combined vinyl chloride and/or vinylidene chloride to interpolymerize the components of the polymerizable formulation and graft a portion of the polymer thus formed onto the rubbery interpolymer and (B) blending the graft copolymer blend thus formed with a polymer of at least about 75 percent by weight of a vinyl halide and up to about 25 percent by weight of copolymerizable materials to form a compatible blend having desirable impact properties; the graft copolymer blend and the vinyl halide polymer being so proportionated that the rubbery interpolymer substrate of the graft copolymer constitutes about 2–20 percent by weight of the blend.

2. The process of claim 1 wherein the vinyl halide is vinyl chloride.

3. The process of claim 1 wherein the graft copolymer blend and the vinyl halide polymer have substantially equivalent refractive indices to provide a substantially transparent blend.

4. The process of claim 1 wherein the monovinylidene aromatic monomer is styrene.

5. The process of claim 1 wherein the rubbery interpolymer is a copolymer of 25–60 percent by weight of ethylene and 75–40 percent by weight of vinyl chloride.

6. The process of claim 5 wherein 70–150 parts by weight of the polymerizable formulation are interpolymerized in the presence of 100 parts of weight of the rubbery interpolymer.

7. The process of claim 6 wherein the vinyl halide is vinyl chloride and wherein the graft copolymer blend and the vinyl halide polymer have substantially equivalent refractive indices to provide a substantially transparent blend.

8. A polyblend comprising (A) a matrix of a polymer of at least about 75 percent by weight of a vinyl halide and up to about 25 percent by weight of copolymerizable materials and (B) a graft copolymer blend dispersed therein in such proportions that the substrate of the graft copolymer constitutes about 2–20 percent by weight of the polyblend; said graft copolymer blend having (1) 100 parts by weight of a substrate formed by a rubbery interpolymer comprising about 25–75 percent by weight of combined ethylene and about 75–25 percent by weight of combined vinyl chloride and/or vinylidene chloride and (2) 50–250 parts by weight of a superstrate formed by polymers comprised of about 35–80 percent by weight of at least one monovinylidene aromatic monomer of the group consisting of monovinylidene aromatic hydrocarbons and ring-halogenated monovinylidene aromatic hydrocarbons and about 65–20 percent by weight of at least one comonomer of the group consisting of acrylonitrile, methacrylonitrile, ethacrylonitrile, alpha-methylene glutaronitrile, and an alkyl (alk)acrylate corresponding to the formula:

wherein R is H or an alkyl group of one to six carbon atoms and R' is an alkyl group of one to 15 carbon atoms; said graft copolymer blend exhibiting good phase adhesion with the vinyl halide polymer matrix and providing highly desirable impact properties.

9. The polyblend of claim 8 wherein the vinyl halide is vinyl chloride.

10. The polyblend of claim 8 wherein the graft copolymer blend and the vinyl halide polymer have substantially equivalent refractive indices to provide a substantially transparent blend.

11. The polyblend of claim 8 wherein the monovinylidene aromatic monomer is styrene.

12. The polyblend of claim 8 wherein the rubbery interpolymer is a copolymer of 25–60 percent by weight of ethylene and 75–40 percent by weight of vinyl chloride.

13. The polyblend of claim 12 wherein the graft copolymer blend has 70–150 parts by weight of superstrate per 100 parts by weight of substrate and the vinyl halide polymer is polyvinyl chloride.

14. The polyblend of claim 13 wherein the superstrate is formed by polymers comprised of styrene and at least one comonomer of the group consisting of methyl methacrylate and acrylonitrile.

15. The polyblend of claim 8 wherein the superstrate has a polarity gradient provided by at least two different polymers, the different polymers of the superstrate being selected from the group comprising (A) a polymer of the monovinylidene aromatic hydrocarbon with substantially no comonomer and an interpolymer of the monovinylidene aromatic monomer with at least one of the nitrile and alkyl (alk)acrylate comonomers and (B) an interpolymer of the monovinylidene aromatic monomer with the alkyl (alk)acrylate comonomer and an interpolymer of the monovinylidene aromatic monomer with the nitrile comonomer.

* * * * *